(12) United States Patent
Kodama et al.

(10) Patent No.: US 6,980,247 B1
(45) Date of Patent: Dec. 27, 2005

(54) INTRAFINDER DISPLAY APPARATUS, FOR A CAMERA, UTILIZING ORGANIC ELECTROLUMINESCENCE DEVICES

(75) Inventors: Shinichi Kodama, Hino (JP); Tsuyoshi Yaji, Kawagoe (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/420,466

(22) Filed: Oct. 19, 1999

(30) Foreign Application Priority Data

Oct. 30, 1998 (JP) .................................. 10-310762

(51) Int. Cl.[7] ........................ H04N 5/222; G03B 17/18
(52) U.S. Cl. .................................. 348/333.01; 396/287
(58) Field of Search ...................... 348/333.01, 333.02, 348/333.08, 333.09, 333.11; 396/287; 313/504, 313/505

(56) References Cited

U.S. PATENT DOCUMENTS

| | | | | |
|---|---|---|---|---|
| 5,294,870 A | * | 3/1994 | Tang et al. | 313/504 |
| 5,652,930 A | * | 7/1997 | Teremy et al. | 396/287 |
| 5,977,704 A | * | 11/1999 | Shi et al. | 313/504 |
| 6,104,431 A | * | 8/2000 | Inoue et al. | 348/333.01 |
| 6,577,821 B2 | * | 6/2003 | Malloy Desormeaux | 348/333.11 |

FOREIGN PATENT DOCUMENTS

JP      9-189940      7/1997

* cited by examiner

*Primary Examiner*—Thai Tran
*Assistant Examiner*—Luong T. Nguyen
(74) *Attorney, Agent, or Firm*—Frishauf, Holtz, Goodman & Chick, P.C.

(57) ABSTRACT

Organic electroluminescence (EL) devices displaying the information of a camera are formed directly on a surface of a screen mat arranged near an image formation surface of a finder optical system. A CPU for the camera drives the organic EL device, under a forward or a reverse bias, as required, to enable light of a green or a red color to be emitted.

5 Claims, 5 Drawing Sheets

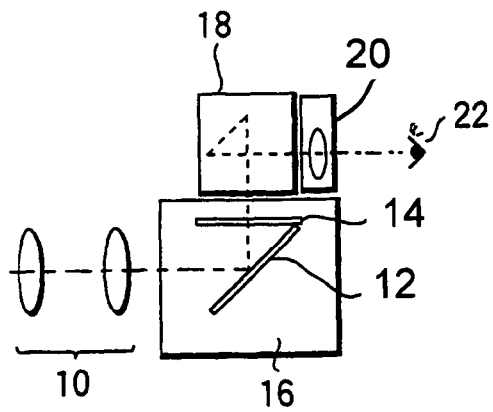
FIG. 1
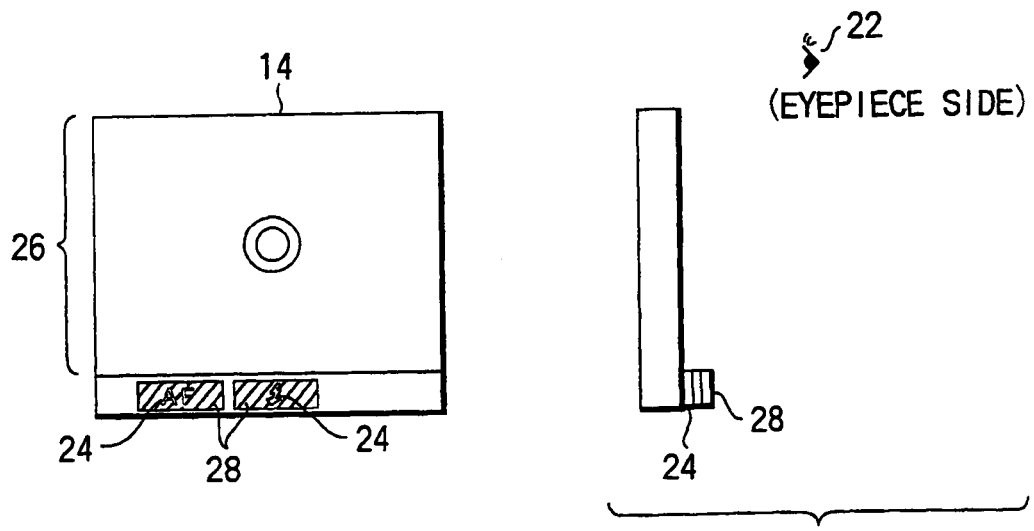
FIG. 2A
FIG. 2B
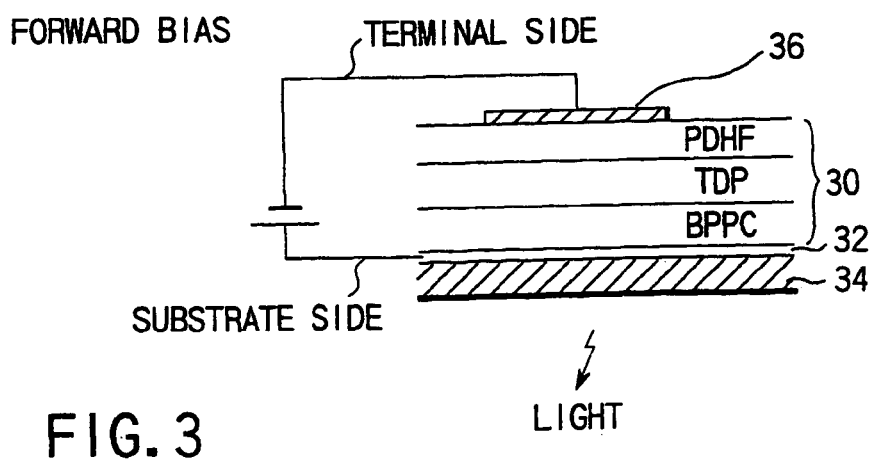
FIG. 3

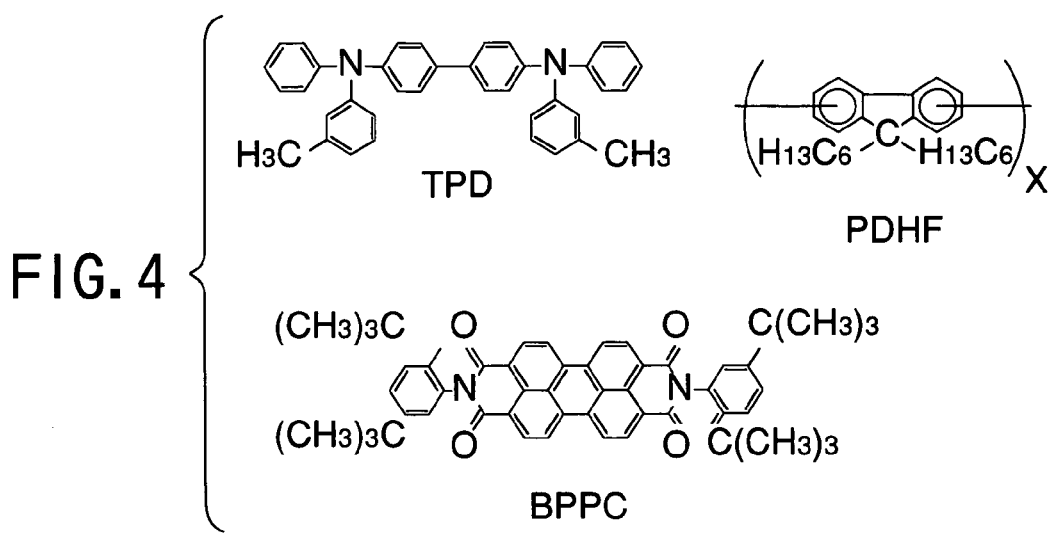
FIG. 4
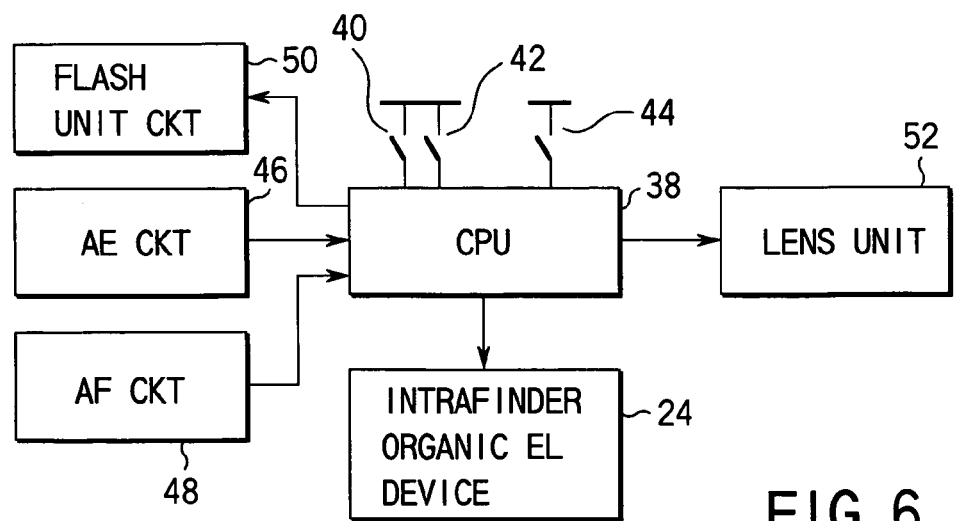
FIG. 5
FIG. 6

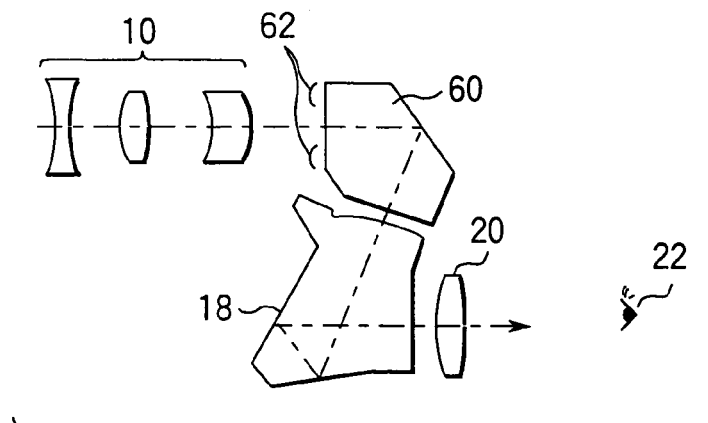
FIG. 10
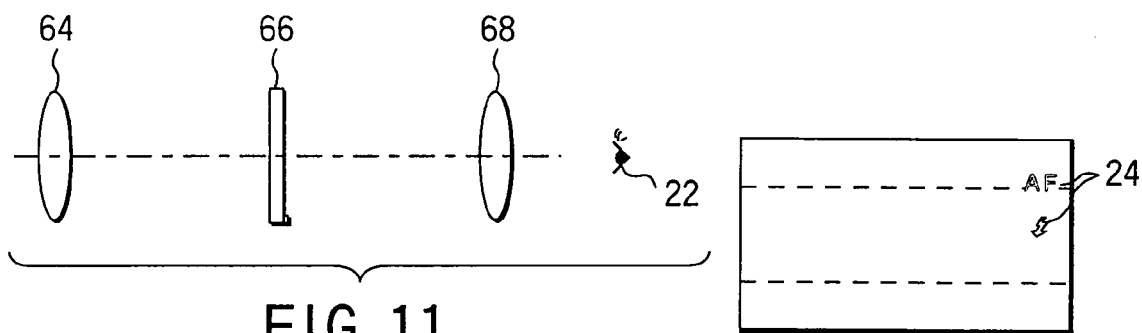
FIG. 11
FIG. 13
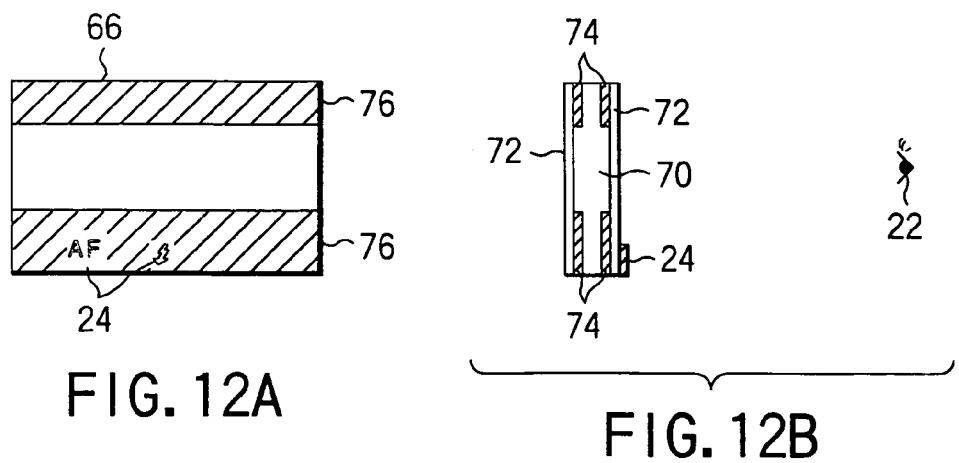
FIG. 12A
FIG. 12B

INTRAFINDER DISPLAY APPARATUS, FOR A CAMERA, UTILIZING ORGANIC ELECTROLUMINESCENCE DEVICES

BACKGROUND OF THE INVENTION

The present invention relates to an intrafinder display apparatus for a camera which displays a camera's state in the finder of the camera and in particular to an intrafinder display apparatus for a camera which effects display through the utilization of an electroluminescence (EL) device.

JPN PAT APPLN KOKAI PUBLICATION No. 9-189940 discloses the technique of arranging a plurality of divided liquid crystal elements in a finder of a camera and driving these elements to display a plurality of information as a pattern.

In the intrafinder display apparatus thus disclosed, however, the liquid crystal elements are not comprised of an illuminant and, therefore, the display itself depends upon transmitting light, so that, at a darker edge being envolved, the display appears dark. For this reason, extra back light, etc., is necessary and the apparatus itself becomes larger.

BRIEF SUMMARY OF THE INVENTION

The present invention has been achieved with the above in view and it is accordingly the object of the present invention to provide an intrafinder display apparatus for a camera which takes up no substantial extra space and achieves a brighter, easy-to-see display at a low cost even in a darker edge involved.

According to a first aspect of the present invention, there is provided an intrafinder display apparatus for a camera, comprising:
  a finder optical system;
  an organic electroluminescence device formed on a surface of an optical member arranged near an image formation surface of the finder optical system; and
  a drive circuit for driving the organic electroluminescence device.

According to a second aspect of the present invention, there is provided an intrafinder display apparatus for a camera, comprising:
  a liquid crystal display element placed in a finder optical system to display information;
  an organic electroluminescence device formed on the surface of the liquid crystal display element; and
  a drive circuit for driving the organic electroluminescence device.

According to a third aspect of the present invention, there is provided an intrafinder display apparatus for a camera, comprising:
  a finder optical system;
  an organic electroluminescence device formed on a surface of an optical member arranged near an image formation surface of the finder optical system;
  an EL drive circuit for driving the electro-luminescence device; and
  a display member arranged in front of the organic electroluminescence device and having an intrafinder display pattern, wherein intrafinder display is effected by illuminating the display member with the organic electroluminescence device.

According to a fourth aspect of the present invention, there is provided an intrafinder display apparatus for a camera, comprising:
  a liquid crystal display element formed in a finder optical path to allow transmittance of light which is incident from a back surface to vary;
  an organic electroluminescence device comprised of a surface illuminant capable of selectively switching emission light to a desired color of a plurality of colors and formed on the liquid crystal display element; and
  display control means for allowing the emission light color of the organic electroluminescence device to vary.

According to a fifth aspect of the present invention, there is provided an intrafinder display apparatus for a camera, comprising:
  a plurality of optical elements constituting a finder of the camera;
  a pattern generator arranged in an optical path of the finder and generating a display pattern of the finder under control of transmitting light; and
  an organic electroluminescence device formed on any of one of the plurality of optical elements and a surface of the pattern generator to illuminate the pattern generator.

According to a sixth aspect of the present invention, there is provided an intrafinder display apparatus for a camera, comprising:
  a screen mat arranged near a primary image forming surface in a finder optical path and providing an effective visual field and a finder image;
  a transmitting type liquid crystal panel arranged near the screen mat and displaying a panorama mask at least at the taking of a panorama;
  an organic electroluminescence device allowing light to be emitted in a plurality of colors; and
  a CPU for controlling the liquid crystal panel and organic electroluminescence device.

According to a seventh aspect of the present invention, there is provided a focal plane plate for exchange comprising:
  a screen for focusing;
  an organic electroluminescence device arranged at an area other than an effective visual field of the screen; and
  an electrical contact section provided at one side portion of the screen to correspond to an electrical contact section on a camera side and connecting a drive circuit on the camera side and the organic electroluminescence device when the focal plane plate for exchange is mounted on the camera.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view showing an array of optical component parts for a single-lens reflex camera with an intrafinder display apparatus according to a first embodiment of the present invention applied thereto;

FIG. 2A is a front view showing a screen mat in FIG. 1 and FIG. 2B is a side view thereof;

FIG. 3 is a cross-sectional view showing a structure of an organic EL device;

FIG. 4 is a view showing a molecular structure of each of stacked macromolecules in FIG. 3;

FIG. 5 is a view showing a relation between a voltage applied across the electrodes of the organic EL device and an operation state;

FIG. 6 is a block diagram showing component parts relating to the present invention of the single-lens reflex camera in FIG. 1;

FIG. 10 is a view showing an arrangement of optical component parts of a compact camera with an intrafinder display apparatus of a camera according to a second embodiment of the present invention applied thereto;

FIG. 11 is a view showing an arrangement of optical component parts of a finder section of a compact camera with an intrafinder display apparatus of a camera according to a third embodiment of the present invention applied thereto;

FIG. 12A is a front view showing a structure of a display element in FIG. 11 and FIG. 12B is a side view thereof; and FIG. 13 is a front view showing a variant of the display element in FIG. 11.

DETAILED DESCRIPTION OF THE INVENTION

Figure 7:
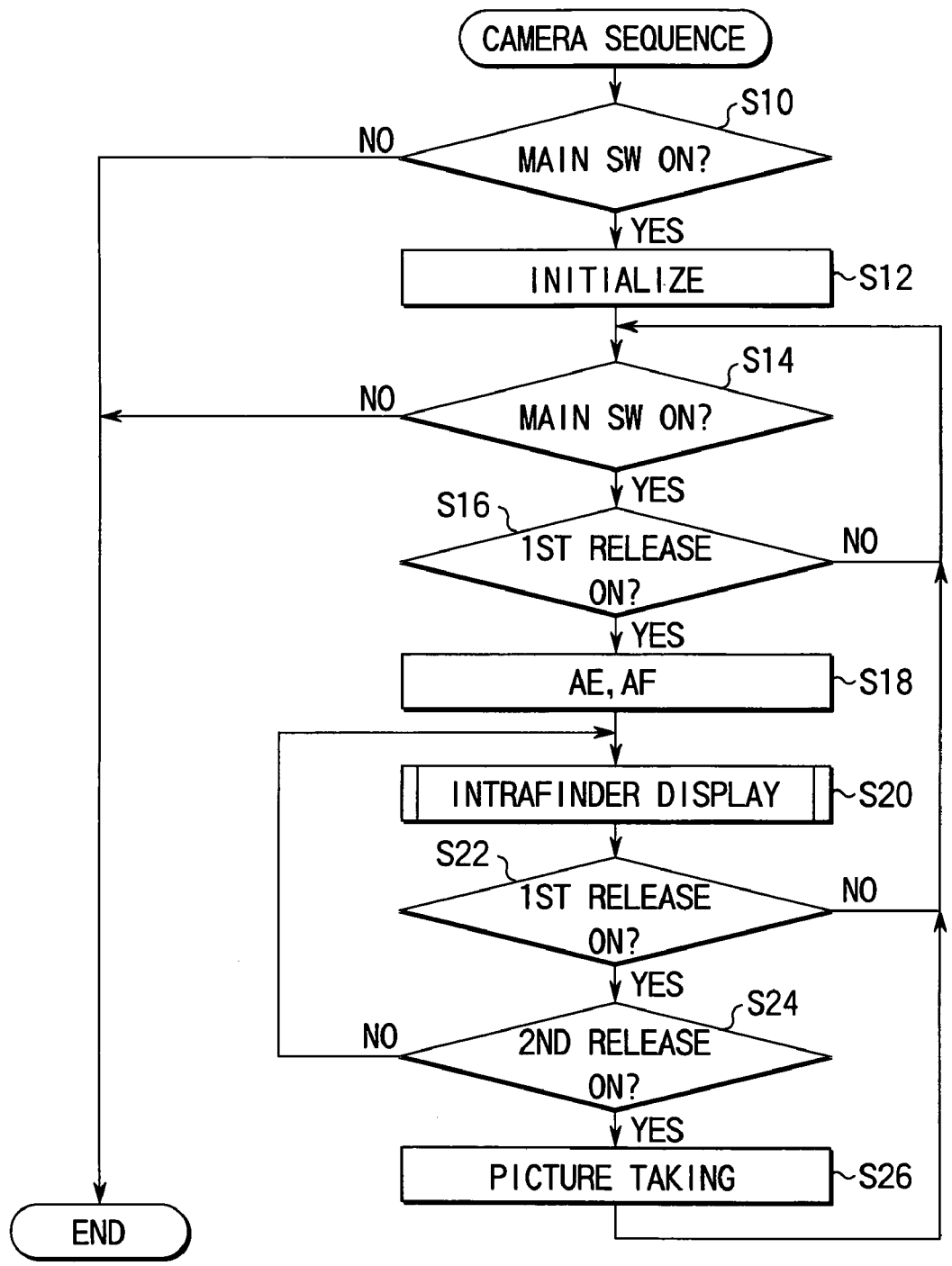
FIG. 7 is a flow chart showing an operation sequence of the single-lens reflex camera in FIG. 1.

An embodiment of the present invention will be explained below with reference to the accompanying drawing.

First Embodiment

An intrafinder display apparatus of a camera according to a first embodiment of the present invention is such that organic electroluminescence (hereinafter referred to as EL) devices serving as color light emitting elements are directly formed on a screen surface of a single-lens reflex camera.

In general, in a single-lens reflex camera, as shown in FIG. 1, a subject image from a photographing lens unit 10 leads to the eye 22 of a photographer through a mirror 12 and screen mat (focal plane plate) 14 in a camera body 16, a pentaprism 18 in a finder section and an eyepiece optical system 20. As shown in FIGS. 2A and 2B, two organic EL devices 24 are formed on the eyepiece side at an area (a lower portion in the present embodiment) other than a visual field 26 where the subject image is seen on the screen mat 14. A light shielding pattern 28 defining a character pattern "AF" is cut-formed at one of the organic EL devices 24 and a light shielding pattern 28 defining a diagonal arrow pattern is cut-formed at the other organic EL device 24. Here, the organic EL device 24 is formed directly on the screen mat 14 with the use of a vapor evaporation, spin-coating, dipping or photobleaching method. And the light shielding pattern 28 is formed by the vapor evaporation and printing.

The organic EL device 24 is so configured that, as shown in FIG. 3, stacked macromolecules (BPPC, TDP, PDHF) 30 are formed between an ITO transparent electrode 32 on a glass substrate 34 and an Mg-In electrode 36. It is to be noted that the molecular structures of the BPPC, TDP and PDHF are as shown in FIG. 4. And as shown in FIG. 5 the organic EL device emits green light in a forward bias state in which a predetermined voltage (5 to 8V) is applied only to the ITO transparent electrode 32 on the substrate side and emits red light in a reverse bias state in which the above-mentioned predetermined voltage is applied only to the Mg-In electrode 36.

Such organic EL device 24 is formed on the screen mat 14 with the ITO transparent electrode (not shown in FIG. 2B) set on the eyepiece side. As required, the forward or reverse bias is applied, so that the character pattern "AF" or diagonal arrow pattern can be displayed in a green color or red color.

FIG. 6 is a block diagram showing an electrical arrangement of the single-lens reflex camera for that purpose. The organic EL device 24 is connected to a CPU 38 for controlling the camera as a whole. That is, the organic EL device 24 has a drive voltage specification substantially conform to that of the CPU 38 and, for this reason, is supplied, under the CPU 38, with a corresponding drive waveform as shown in FIG. 5 and directly controlled.

A first release switch (1st RSW) 40 and second release switch (2nd RSW) 42 and a main switch 44 are connected to the CPU 38, the 1st RSW 40 being turned ON by pushing down a first stage of a release button, not shown, arranged on an upper surface side of the camera and the 2nd RSW 42 being turned ON by pushing down a second stage of a release button. Further, an AE circuit 46, AF circuit 48, flash unit circuit 50 and lens unit 52 are connected to the CPU 38, the AE circuit 46 measuring the intensity of a subject, the AF circuit 48 measuring the distance to the subject, the flash unit circuit 50 being flash controlled, as required, under the CPU 38 on the basis of a result of measurement by the AE circuit 46, and the lens unit 52 being focus controlled, under the CPU 38, on the basis of a result of measurement by the AF circuit 48.

FIG. 7 is a flow chart showing an operation sequence executed by the CPU 38 in the single-lens reflex camera thus arranged. It is to be noted that, for brevity's sake, this operation flow chart shows only a portion relating to the driving of the organic EL device 24.

That is, when the main switch 44 is turned ON (step S10), the CPU 38 initializes each associated section (step S12).

Then the CPU 38 decides whether or not the main switch 44 is turned ON (step S14). If it is not turned ON, this process is terminated.

If, on the other hand, the main switch 44 is turned ON, then the CPU 38 decides whether or not the 1st RSW 40 is turned ON (step S16). If, on the other hand, it is not turned ON, the process goes back to the step S14.

If the 1st RSW 40 is turned ON, the measuring of the light intensity and distance is made by the AE circuit 46 and AF circuit 48 (step S18). In accordance with that result, an intrafinder display is carried out (step S20), a detail of which will be set out below. After the intrafinder display process is performed, the CPU 38 again decides whether or not the 1st RSW 40 is turned ON (step S22). If it is not turned ON, the process goes back to the step S14.

If, on the other hand, the 1st RSW 40 is turned ON, the CPU further decides whether or not the 2nd RSW 42 is turned ON (step S24). If the 2nd RSW 42 is not turned ON, the process goes back to step S20.

And if the 2nd RSW 42 is turned ON, the photographing operation is performed (step S26) and then the process goes back to step S14.

Figure 8:
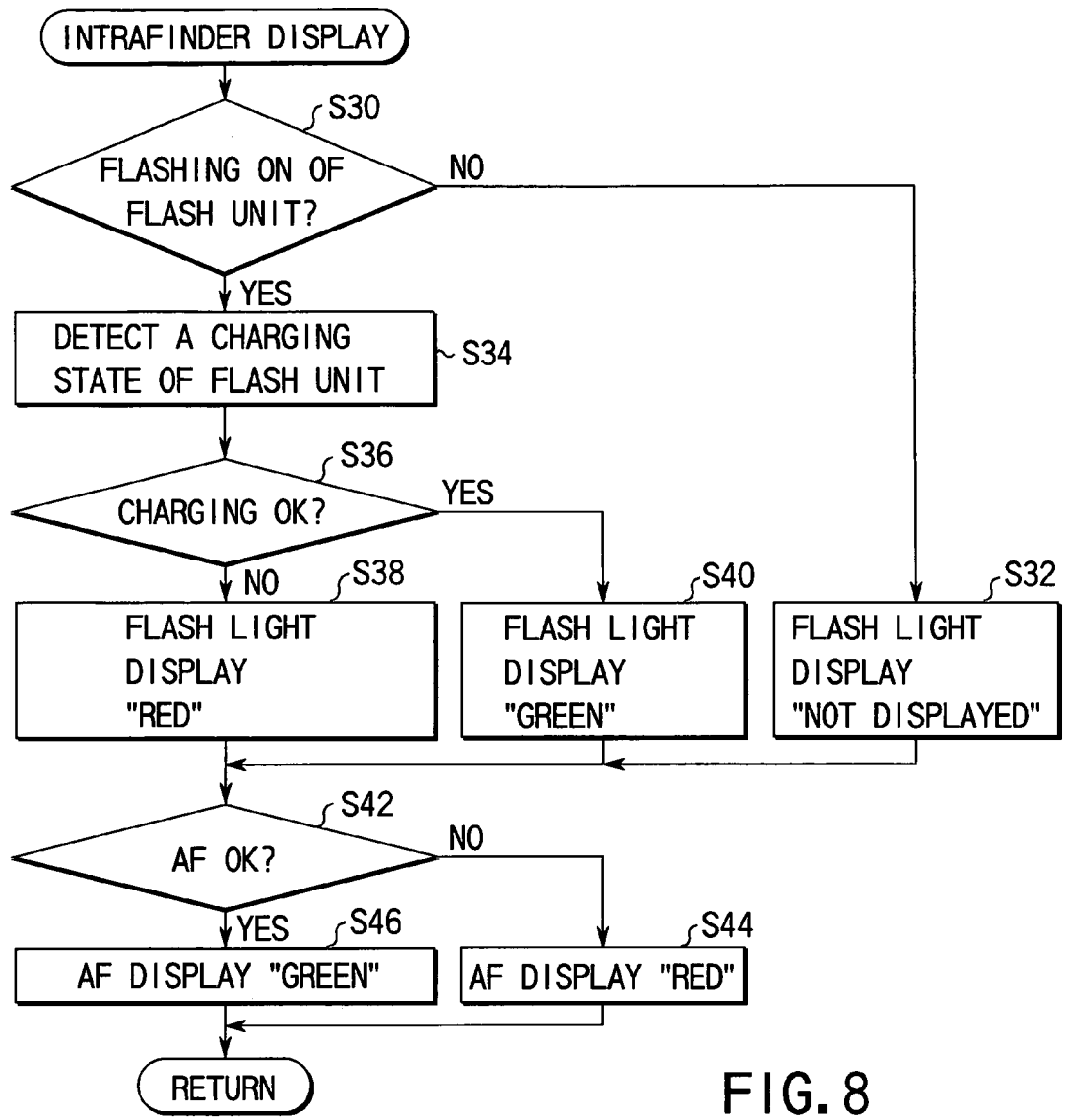
FIG. 8 is a flow chart showing an intrafinder display process in FIG. 7.

The intrafinder display process at step S20 is performed as shown in FIG. 8.

As a result of measuring the light intensity by the AE circuit 46, the CPU decides whether or not a flash unit, not shown, need be turned ON by the flash unit circuit 50 (step S30). If it need not be turned ON, then the process goes to step S42 as will be later described without emitting light from the organic EL device 24 (diagonal arrow pattern) for flashing light display (step S32).

If, on the other hand, the flash unit need be flashed ON, the charging state of the flash unit is detected by a known detecting means not shown (step S34) and it is decided whether or not the charging is completed (step S36). If, as a result, the charging is not sufficient, the organic EL device 24 for flash light display is reverse biased and emits red color light (step S38). If, on the other hand, the charging is completed, the organic EL device 24 for flash light display is forward biased and emits green light (step S40).

On the other hand, the CPU 38 drives the lens unit 52 in accordance with a result of the measuring of the distance by the AF circuit 48 and, after the execution of any of steps S32, S38, S40, decides whether or not the unit is set just in focus (step S42). If the unit is not set just in focus, the organic EL device 24 (character pattern "AF") for AF display is reverse biased and emits red light (step S44). If, on the other hand, it is set just in focus, the organic EL device 24 for AF display is forward biased and emits green light (step S46). And the process goes back to a higher-order routine.

Although in the present embodiment the light shield patterns 28 defining the character pattern "AF" and diagonal arrow pattern are cut-formed on the organic EL device 24, they may be formed to have the configuration of such character pattern and diagonal arrow pattern.

Figure 9:
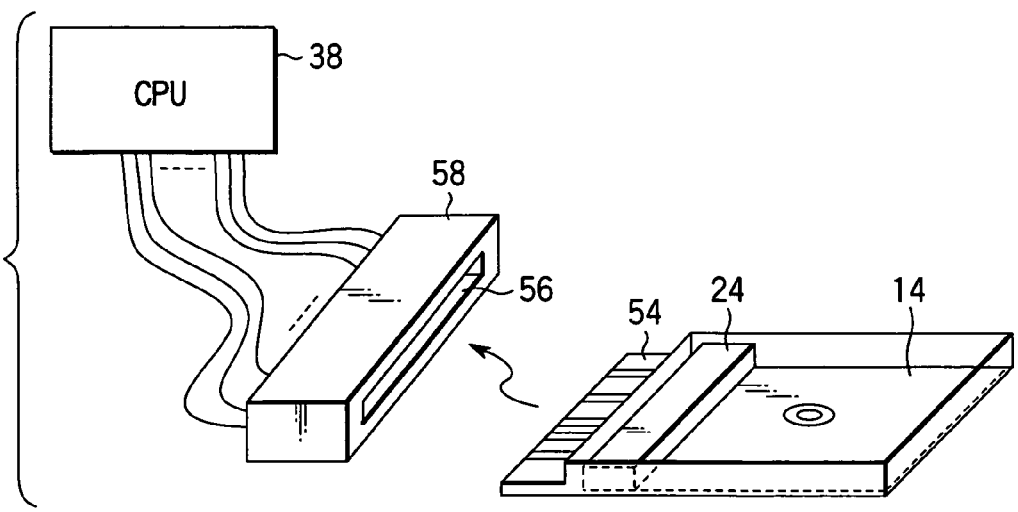
FIG. 9 is a view showing an exchangeable structure for a screen mat.

Although in the above-mentioned embodiment the screen mat 14 is fixed at the camera body 16, it may be detachably structured on the camera body 16 with the use of a connector. As shown in FIG. 9, for example, a cut section 54 is provided on one side portion of the screen mat 14 and is adapted to be fitted into a slit 56 in an in-line connector 58 provided on a camera side. By using such an exchangeable focal plane plate it is possible to provide an intrafinder display made as the user likes.

Second Embodiment

A second embodiment of the present invention will be explained below. The second embodiment is such that organic EL devices are formed at a prism in a finder optical system of a compact camera.

That is, various kinds of finders are present among the compact cameras. As one of them a finder optical system is known which allows a subject image from a photographing lens unit 10 to lead to a photographer's eye 22 through a roof prism 60, penta prism 18 and eyepiece optical system 20. In such a finder structure, a real image formation face (in this case, a photographing lens side) of the roof prism 60 provides a face at which the organic EL devices 24 are formed.

The each organic EL device 24 is formed directly at its EL-device formation face 62 with the use of a vapor evaporation, spin coating, dipping or photobleaching method and it is driven under a forward or reverse bias in the same way as in the first embodiment and two-color light emission display is carried out.

Third Embodiment

A third embodiment of the present invention will be explained below. The third embodiment is such that organic EL devices are formed directly at a liquid crystal glass for intrafinder display in a compact camera.

As one of the finder structures of compact cameras, a type is known which comprises an objective optical system 64, display element 66 and eyepiece optical system 68. Here, as shown in FIGS. 12A and 12B, the display element 66 is comprised of a liquid crystal mask with a liquid crystal 70 sandwiched with cover glasses 72 and, when a predetermined voltage is applied to those electrodes 74 corresponding to panorama patterns 76, sets the corresponding liquid crystal portions in a light shielding state to allow a shift to a visual field corresponding to a panorama photo-graphing. And the organic EL devices 24 are formed directly on the cover glass surface (on the eyepiece side) of the liquid crystal mask with the use of a vapor evaporation, spin coating, dipping or photobleaching method. Although, in the Figures above, electrodes of the each organic EL device 24 are not shown in particular, an ITO transparent electrode 32 is formed on the eyepiece side.

Even in the third embodiment, as in the case of the above-mentioned first embodiment, the organic EL devices 24 are driven under a forward or a reverse bias and, by doing so, it is possible to effect a two-color light emission display.

Although, in the third embodiment, the organic EL devices are formed as a character pattern "AF" and diagonal arrow pattern, they may be cut to define shield patterns 28 corresponding to these patterns as in the case of the first embodiment.

Further, as shown in FIG. 13, the organic EL devices may be formed in any position unless that position adversely affects an observation of a subject image.

Although the present invention has been explained based on the above-mentioned embodiments, it is needless to say that the intrafinder display may be applied not only to the above-mentioned flash unit and AF warning but also to the display of various kinds of information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An intrafinder display apparatus for a camera, said intrafinder display apparatus comprising:
    a finder optical system for guiding an image of a subject along an optical path to a viewing element;
    an organic electroluminescence device formed directly on a surface of an optical member surface in the optical path of said finder optical system; and
    a drive circuit for driving said organic electroluminescence device.

2. The apparatus according to claim 1, wherein said organic electroluminescence device comprises a surface illuminant for selectively switching emission light to a desired color of a plurality of colors, and
    wherein said drive circuit is driven to switch the color of the emission light in accordance with an operation state of a camera.

3. The apparatus according to claim 1, wherein said optical member comprises a prism, and said organic electroluminescence device is formed on one face of said prism.

4. The apparatus according to claim 1, wherein said organic electroluminescence device is formed on the surface of the optical member by one of vapor evaporation, spin coating, dipping and photobleaching.

5. The apparatus according to claim 1, wherein
    said organic electroluminescence device comprises a surface illuminant for selectively switching emission light to a desired color of a plurality of colors.

* * * * *